United States Patent [15] 3,703,603

Levesoue et al. [45] Nov. 21, 1972

[54] RUB-ON SUB-ELEMENT FOR ELECTRONIC CIRCUIT BOARD

[72] Inventors: Norman R. Levesoue; Donald E. Harper, both of Inglewood, Calif.

[73] Assignee: Circuit-Stik, Inc., Gardena, Calif.

[22] Filed: May 10, 1971

[21] Appl. No.: 141,655

[52] U.S. Cl. ....................174/68.5, 29/625, 117/227, 156/249, 317/101 B

[51] Int. Cl. ............................H05k 1/02, H05k 3/20

[58] Field of Search .................174/68.5, 117 A, 227; 317/101 B, 101 C, 101 CM; 29/625, 626; 156/249; 161/185

[56] References Cited

UNITED STATES PATENTS 3,132,204 5/1964 Giellerup........174/117 A UX 3,538,389 11/1970 Levesque et al......174/68.5 X

*Primary Examiner*—Darrell L. Clay
*Attorney*—Jessup & Beecher

[57] ABSTRACT

An electronic sub-element is provided having a particular circuit configuration, and which in conjunction with other similar sub-elements of the same or different circuit configuration, may be adhesively attached to a panel-like base member so as to constitute a printed circuit assembly. The electronic sub-element of the invention is in the form of conductive metallic particles which are adhesively attached to a carrier strip, such as plastic or wax paper, and which form a multiplicity of electrical conductors separated from one another, the particles being intermixed with adhesive material.

4 Claims, 11 Drawing Figures

INVENTORS:
Norman R. Levesque
Donald E. Harper
Kemp and Beecher
By Keith D. Beecher
ATTORNEYS INVENTORS:
Norman R. Levesque
Donald E. Harper
Jenny and Beecher
By Keith D. Beecher
ATTORNEYS INVENTORS:
Norman R. Levesque
Donald E. Harper
By Kemp and Beecher
Keith D. Beecher
ATTORNEYS

RUB-ON SUB-ELEMENT FOR ELECTRONIC CIRCUIT BOARD

BACKGROUND OF THE INVENTION

The electronic sub-element of the present invention is generally similar to the sub-elements disclosed and claimed in Patent Application Ser. No. 801,542, filed Feb. 24, 1969, which has now issued as U.S. Pat. No. 3,538,389, dated Nov. 3, 1970, and in Copending Application Ser. No. 141,869, filed May 10, 1971 in the names of the present inventors. The sub-elements described, for example, in U.S. Pat. No. 3,538,389, are in the form of a thin flexible epoxy or plastic strip, the strip having a basic circuit formed thereon by printed circuit techniques. The complete circuit board assemblies are then formed in accordance with the teaching of the said copending application by mounting the individual sub-elements with selected circuit patterns thereon on the larger circuit board substrate to form the desired circuit pattern.

The circuits on the sub-elements described in the aforesaid copending applications may be interconnected by circuit components, wire jumpers, conductive tape, or other appropriate means. To assist in the mounting of the sub-elements of U.S. Pat. No. 3,538,389, the thin carrier insulating strip of each sub-element is backed with a pressure-sensitive or other type of adhesive, so that the sub-elements may quickly and easily attached to the supporting circuit board substrate.

In the practice of the concept described in the Application Ser. No. 141,869, on the other hand, individual sub-elements are provided in the form of electronic circuit patterns which are adhesively attached to thin paper, epoxy or plastic strips, but which may be subsequently detached from the carrier strips when the circuit patterns are mounted on the circuit board substrate, as described in the said copending application.

The sub-elements of the present invention are generally similar to the sub-elements of the Copending Application Ser. No. 141,869, in that both are carried by appropriate carrier strips. However, in the case of the sub-elements of the present invention, the electrical conductors are in the form of metallic particles intermixed with an appropriate adhesive, as mentioned above, and carried on an appropriate strip carrier, such as plastic or wax paper.

The sub-elements of the present invention may be attached to the base board by placing the wax paper face downwardly on the board, and by rubbing the sub-element onto the surface of the board. The process may be repeated for each of the sub-elements to be attached to the board, so that an entire printed circuit may be synthesized. In accordance with one embodiment of the invention, and when thermally settable adhesive is used, the board may be heated after all the elements have been attached, so as to set the adhesive and cause the adhesive to be permanently affixed to its surface.

Entire circuits, as well as individual circuit components, or element mounting patterns or connection patterns, may be formed on the individual sub-element carrier strips. The sub-elements are then selected as needed, and mounted on the circuit board in selected patterns, as mentioned above, so as to form any desired complete electronic circuit configuration. As mentioned above, interconnections between the sub-elements on the circuit board may be made in a variety of ways. For example, adhesively backed electrically conductive tape may be used, or pre-punched, or die cut conductors of selected shapes, or insulated or bare wire jumpers, may be used. Moreover, the sub-element circuit patterns may be used in conjunction with integrated circuits, transistors, resistors, capacitors, and other discrete circuit components, on the circuit board.

As mentioned above, in order to mount a sub-element of the invention on the circuit board, the sub-element is pressed, face downwardly, on the surface of the board in its pre-assigned position. The element is then rubbed until the particles forming the electrical design on the carrier, and the intermixed adhesive, are rubbed onto the surface of the board. The wax paper strip carrier of the sub-element is then removed, leaving only the circuit pattern on the circuit board. The operation is then repeated with other sub-elements bearing the same or different circuit patterns, until an entire circuit is synthesized on the surface of the board. The assembly is then placed, for example, in an oven so as to set the adhesive, as suggested above. However, the latter step may be obviated if appropriate adhesive is used which is capable of setting at room temperatures. Present day heat and pressure sensitive adhesives are suitable for that purpose.

The circuit boards on which the sub-elements are mounted may be undrilled, or they may be pre-drilled to provide various grid patterns so as to permit discrete components to be mounted on the circuit board and connected to the circuitry of the sub-element. As an alternative, holes may be provided in the circuit board substrate matching similar hole patterns in the sub-element rub-on circuit.

The concept of the present invention is advantageous in that any required electronic circuit may be synthesized easily and simply on the circuit board, merely by rubbing the selected sub-element circuit patterns onto the board in a selected relationship, and by then mounting the discrete circuit components and interconnecting conductors on the circuit board substrate in electrical contact with the individual sub-element circuits. Cost savings may be realized by utilization of the concept of the present invention, especially in the areas of design packaging, assembly, testing and modification of the electronic circuit board assembly.

The resulting circuit board constructed in accordance with the teachings of the present invention is extremely durable, and is capable of withstanding harsh environments, including extreme temperature variations, severe extraneous vibrations, external radiations, moisture, salt spray, fungus and other contaminants. As mentioned above, an important aspect of the concept of the present invention is that changes and modifications to existing electronic circuits may be made easily when the sub-element concept of the invention is used, as compared with the difficulty in making changes to the usual prior art circuit board assemblies. Changes may be made, for example, merely by adding or replacing one or more of the sub-elements on the circuit board.

DETAILED DESCRIPTION OF THE ILLUSTRATED EMBODIMENT

Figure 4:
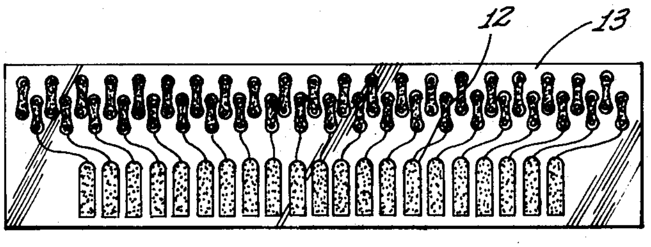
Figure 5:
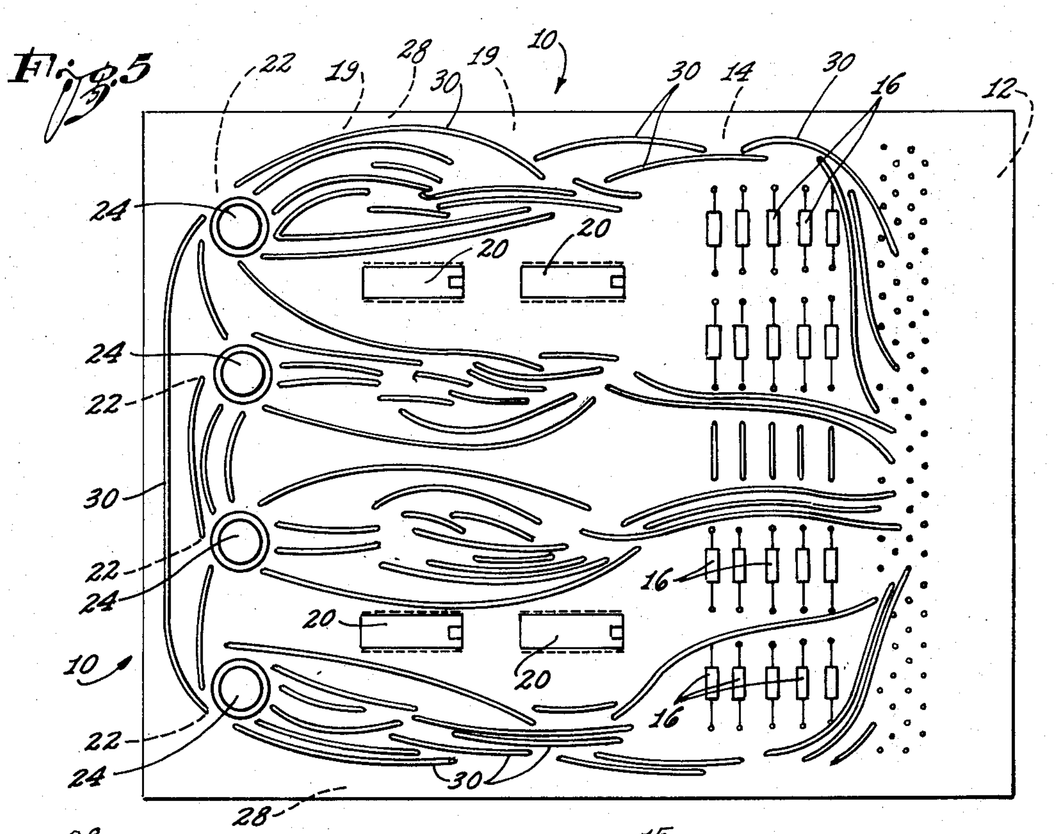
FIG. 5 is a top plan view of a printed circuit board assembly.
Figure 6:
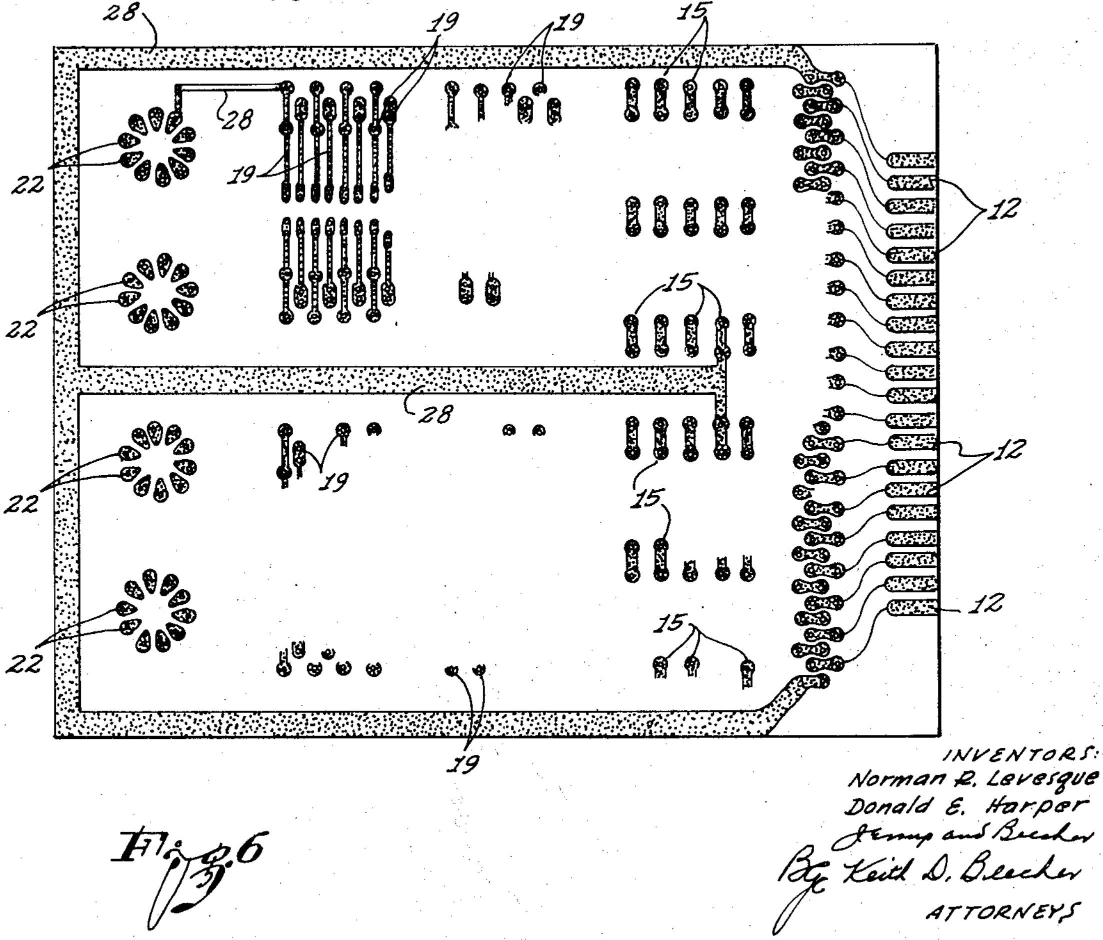
FIG. 6 is a bottom view of the circuit board assembly of FIG. 5 and showing various sub-elements affixed to the under surface of the board in accordance with the concepts of the present invention.

As shown in FIGS. 5 and 6, a substrate board or panel 10 for the illustrated electronic circuit assembly is provided. The panel 10 may be either rigid or flexible, and it may be formed of any appropriate plastic, epoxy, fiberboard, metal, ceramic or other suitable material. Moreover, the board 10 may be drilled in a predetermined hole pattern, as mentioned above. The electronic circuitry of the board 10 is made up of different sub-elements which incorporate the concept of the invention. For example, on one end of the board 10 is a sub-element 13 which is shown in FIG. 4. The sub-element 13 comprises circuitry 12 constituting end connections or terminals for the electronic circuit on the panel 10, so that the circuit assembly may be plugged into a suitable receptacle in appropriate electronic equipment in accordance with known practices.

Figure 2:
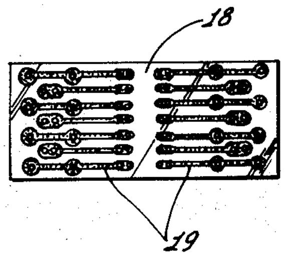
Figure 3:
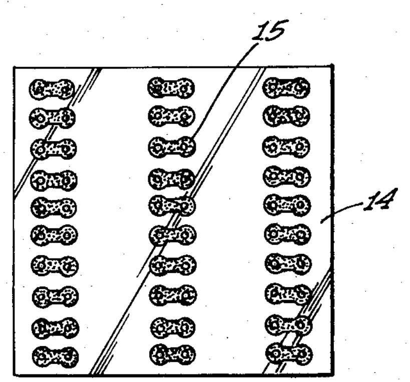

A plurality of sub-elements 14 are also mounted on the board 10, the sub-elements 14 each including an electric circuit 15 of a pattern such as shown in FIG. 3. The electric circuit 15 on the sub-element 14 constitutes connectors, for example, for a plurality of resistors 16 which are mounted on the opposite side of the panel 10, as shown in FIG. 5, and whose terminal wires extend through holes in the panel and through aligned holes in the conductors of circuit 15 and are soldered to such conductors. Likewise, additional sub-elements 18 are mounted on the underside of the panel 10, each including a circuit 19 as shown in FIG. 6, these latter sub-elements being of the form shown in FIG. 2.

Figure 1:
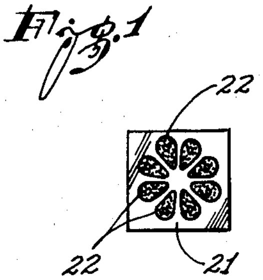
FIGS. 1–4 are top plan views of sub-elements incorporating the principles of the invention, and each sub-element representing a different circuit pattern.

In addition, a plurality of sub-elements 21, and which are shown in more detail in FIG. 1, may also be mounted on the underside of the panel 10, and these latter sub-elements may form mounting circuit patterns 22 (FIG. 6) for the individual transistors 24 shown in FIG. 5.

As shown in FIG. 6, the circuitry of the different sub-elements may be interconnected by pressure sensitive conductive tapes 28 extending along the underside of the board. In addition, connections may be made by wire jumpers 30 shown in FIG. 5 which are connected between the circuits of the sub-elements and which extend across the upper side of the panel, as shown. The electrically conductive tapes 28 may be of the type described, for example, in Giellerup U.S. Pat. No. 3,132,204, or in Kilduff et al. U.S. Pat. No. 3,335,545.

The sub-elements of the invention may be formed, as shown in FIG. 1, for example, by bonding electrically conductive particles making up the pattern 22 to a carrier strip forming the sub-element 21. Likewise, in FIG. 2, the particles forming the conductive pattern 19 are bonded to a carrier strip forming the sub-element 18; in FIG. 3, the particles making up the conductive pattern 15 are bonded to a carrier strip forming the sub-element 14, and in FIG. 4 the particles making up the circuit pattern 12 are bonded to a carrier strip forming the sub-element 13.

It is obvious that other appropriate materials may be used to constitute the carrier strips. As mentioned above, the particles of the conductive designs are intermixed with adhesive, so that the designs may be fixed to the circuit board panel, such as shown in FIG. 6, by placing the individual elements shown in FIGS. 1–4 face downwardly on the board, and then by rubbing, as described above.

Figure 7:
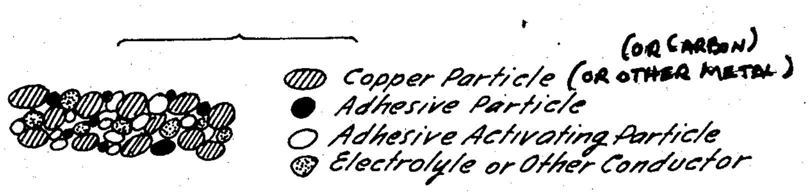
FIG. 7 is an enlarged and magnified representation of the basic compound used in the practice of the invention.

A basic adhesive compound for use in the practice of the invention is shown on a magnified scale in FIG. 7. In the representation of FIG. 7, the conductive particles which may be formed, for example, of copper, carbon, or other appropriate conductor material, are shown as the lined particles; the adhesive particles are shown as the solid particles, and the adhesive activator particles are shown as the blank particles. Electrolytic or other conductive particles represented as the stippled particles may also be included. The adhesive particles and adhesive activator particles may be combined, as is known to the art. The electrolytic particles are optional, since suitable results may be achieved by means of the previously mentioned copper or carbon particles.

Insofar as the adhesive is concerned, it should be suitable for silk screen application in the fabrication of the sub-elements. The adhesive, as mentioned above, is activated by heat and pressure which is either generated by the rub-on friction itself, or by subsequent baking in an oven or by exposing the assembly to any appropriate heat environment, after the circuit sub-elements have been applied to the circuit board substrate.

Figure 8:
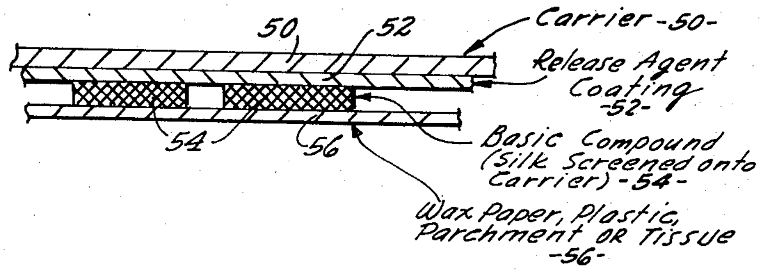
FIGS. 8–10 are enlarged fragmentary sectional views showing various embodiments of the invention.

A cross section of one form of the sub-element constructed in accordance with the invention is shown in FIG. 8. The sub-element includes a carrier 50 composed, for example, of paper, Mylar or other suitable substance. A release agent coating 52 formed, for example, of wax is placed on the carrier 50, and the basic compound, such as shown in FIG. 7, is silk screened onto the release coating 52, as designated by the segment 54. Finally, a waxed paper, parchment or tissue release member 56 is formed over the basic compound 54.

The sub-element of FIG. 8 is then applied to an appropriate circuit board substrate, by first removing the release member 56. The basic compound design 54 is then placed on the surface of the substrate, and rubbing, by means, for example, of an appropriate burnishing tool is applied over the top surface of the carrier 50. The resulting heat and pressure causes the compound design 54 to become adhesively attached to the substrate, the heat generated by the rubbing action melting the release agent coating 52. Then, as a final step, the carrier 50 is removed from the resulting circuit.

Figure 9A:
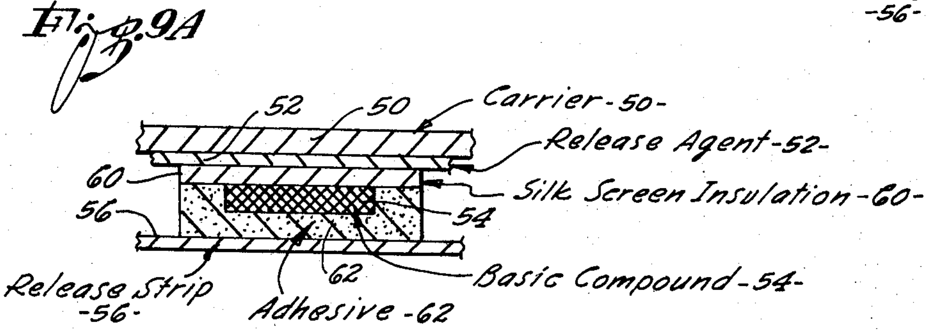
Figure 9B:
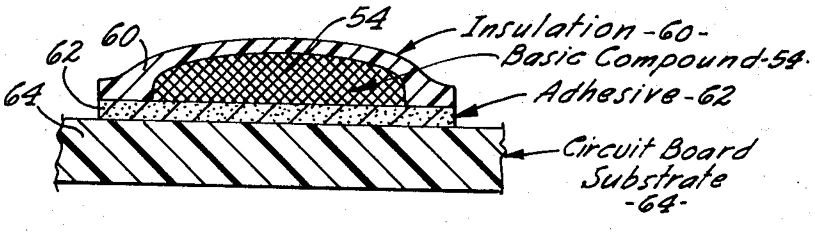

In the embodiment shown in FIGS. 9A and 9B, an insulation layer 60 of any appropriate material, such as vinyl plastic, for example, is silk screened onto the release agent 52 between the basic compound design 54 and the release agent layer 52. An adhesive layer 62 is then formed over the insulation layer 60 and over the basic compound design 54 on the insulation layer.

The sub-element of FIG. 9A is applied to a circuit board substrate, such as the substrate 64 in FIG. 9B, as in the previous embodiment, and by first removing the release strip 56. Then, pressure and friction is applied to the carrier 50, so as to melt the release agent 52, and cause the basic compound circuit design 54 to become adhesively attached to the circuit board 64. However, in this latter embodiment, the circuit design embodied by the basic compound 54 is completely encased by the insulation layer 60. This means that in the embodiment of FIGS. 9A and 9B, other circuits may be formed over the circuit shown, without short circuits occurring.

Figure 10:
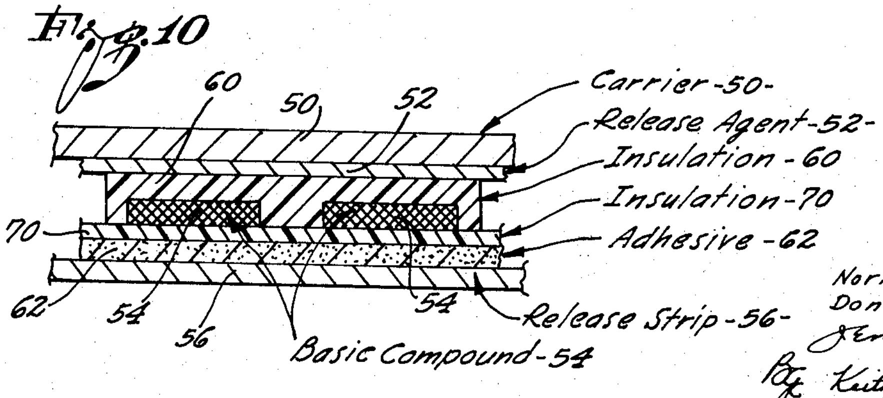

The embodiment shown in FIG. 10 is an extension of the embodiment of FIGS. 9A and 9B, and incorporates a further insulation layer 70 between the basic compound circuit design 54 and the adhesive layer 56. The insulation layer 70 may be similar to the insulation layer 60, and it acts with the insulation layer 60 completely to encase the circuit design formed by the basic compound 54.

The invention provides, therefore, an electronic circuit board assembly which is easy to fabricate, in that a plurality of sub-elements each containing similar or different circuit diagrams may be selectively bonded to a circuit board panel in the manner described. It is obvious, of course, that the various sub-element designs shown in FIGS. 1–6 are merely illustrative, and many other designs may be used.

Therefore, while particular embodiments of the invention have been shown and described, modifications may be made, and it is intended to cover all such modifications as fall within the spirit and scope of the invention in the following claims.

What is claimed is:

1. A sub-element for use on an electronic circuit board comprising: a carrier strip, a multiplicity of electrical conductors on said strip in the form of electrically conductive particles and intermixed adhesive material for causing said particles to be adhesively attached to said circuit board, and a release agent mounted on said carrier strip and interposed between said carrier strip and said electrical conductors and responsive to heat to release the electrical conductors therefrom.

2. The combination defined in claim 1, in which said adhesive material is responsive to heat and pressure.

3. The combination defined in claim 1, and which includes an insulation layer between said carrier strip and said conductors.

4. The sub-element defined in claim 1, and which includes an insulation layer encompassing and surrounding said electrical conductors on said strip.

* * * * *